United States Patent
Xu et al.

(10) Patent No.: US 12,511,190 B1
(45) Date of Patent: Dec. 30, 2025

(54) MEMORY PAGE ERROR TRACKING

(71) Applicant: Amazon Technologies, Inc., Seattle, WA (US)

(72) Inventors: Kun Xu, Austin, TX (US); Leena Elzeiny, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/611,541

(22) Filed: Mar. 20, 2024

(51) Int. Cl.
*G06F 11/10* (2006.01)
*G06F 12/0891* (2016.01)

(52) U.S. Cl.
CPC ...... *G06F 11/1064* (2013.01); *G06F 11/1016* (2013.01); *G06F 12/0891* (2013.01)

(58) Field of Classification Search
CPC ............. G06F 11/1064; G06F 11/1016; G06F 12/0891
See application file for complete search history.

(56) References Cited

U.S. PATENT DOCUMENTS

| | | | | |
|---|---|---|---|---|
| 10,908,987 | B1* | 2/2021 | Pandey | G06F 3/0659 |
| 2009/0055680 | A1* | 2/2009 | Honda | G06F 11/1068 |
| | | | | 714/E11.023 |
| 2015/0309872 | A1* | 10/2015 | Cai | G06F 11/1076 |
| | | | | 714/764 |
| 2018/0307431 | A1* | 10/2018 | Gunnam | G11C 29/00 |

OTHER PUBLICATIONS

Schroeder et al., "DRAM Errors in the Wild: A Large-Scale Field Study," *Proceedings of the Eleventh International Joint Conference on Measurement and Modeling of Computer Systems, SIGMETRICS/Performance '09*, Jun. 2009, 12 pages.

* cited by examiner

*Primary Examiner* — Thien Nguyen
(74) *Attorney, Agent, or Firm* — Klarquist Sparkman, LLP (57) ABSTRACT

In memory reads, an increase in a number of correctable errors increases a likelihood that an uncorrectable error will occur. Thus, tracking of correctable errors per memory page is one technique that can be used and if the number of errors on a memory page exceeds a threshold then the memory page can be replaced through dynamic memory re-mapping. However, having a counter per memory page to track the errors is costly due to the number of memory pages. Accordingly, a system is proposed wherein a group of counters is used that acts as a cache of counters that track memory pages of interest due to a variety of factors. Additionally, an eviction policy can control which memory pages are tracked so that only the most interesting candidate pages can be tracked in accordance with a policy.

18 Claims, 8 Drawing Sheets

MEMORY PAGE ERROR TRACKING

BACKGROUND

Memories, such as high-bandwidth memory (HBM) and dynamic random-access memory (DRAM) can use error correction codes (ECC) to detect and correct data corruption that occurs in the memory. Single-bit errors, generally, can be corrected using ECC, but multi-bit errors are sometimes uncorrectable. Uncorrectable errors can be more catastrophic and can force a machine shutdown. Sometimes, a technician can then replace a dual in-line memory module (DIMM) that caused the failure. However, some HBM devices can be more difficult to replace, especially if the HBM is soldered to a substrate.

Memory errors can be very costly in terms of replacement costs and system downtime. Additionally, with Integrated Circuit (IC) density increasing, the probability of memory errors occurring has been increasing. A solution is needed to reduce multi-bit errors and reduce system downtime.

DETAILED DESCRIPTION

Correctable errors can be used to predict uncorrectable errors in memory. For example, an increase in a number of correctable errors increases a likelihood that an uncorrectable error will occur. Thus, tracking of correctable errors per memory page is one technique that can be used and if the number of errors on a memory page exceeds a threshold then the memory page can be replaced through dynamic memory re-mapping. However, having a counter per memory page to track the errors is costly due to the number of memory pages. Accordingly, a system is proposed wherein a group of counters (that are less than a number of memory pages) is used that acts as a cache of counters that track memory pages of interest due to a variety of factors, such as an amount of errors that occur, how recently an error occurred, whether the error was correctable or uncorrectable, etc. Additionally, an eviction policy can control which memory pages are tracked so that only the most interesting candidate pages can be tracked in accordance with a policy.

Figure 1:
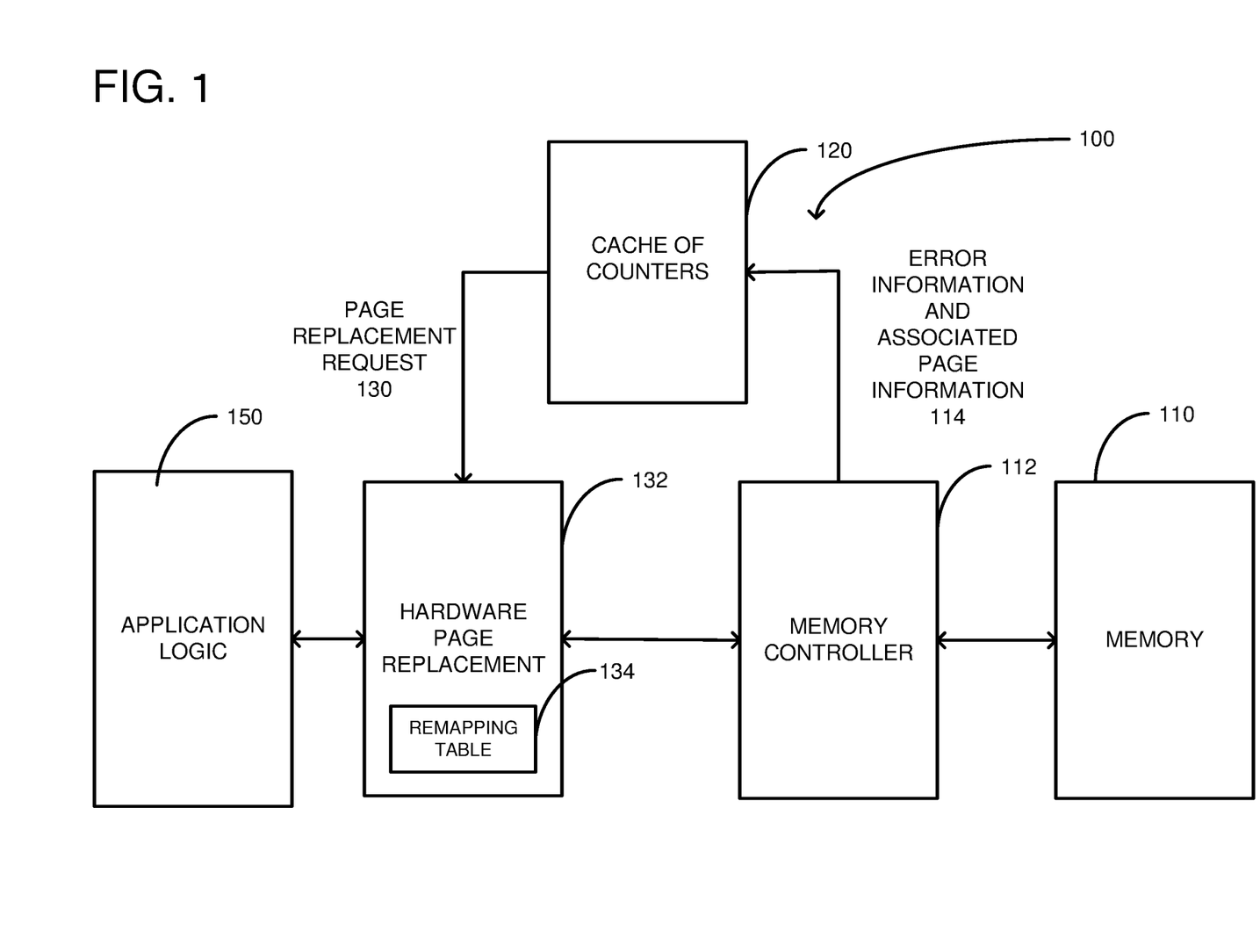
FIG. 1 is a system diagram according to one embodiment, wherein a cache of counters is used to track errors occurring in memory pages.

FIG. 1 is a system 100 according to one embodiment. Although the system 100 is shown as separate components, one or more of the components can be integrated into a system-on-chip (SOC). A memory 110 includes a plurality of memory pages (not shown in FIG. 1 but explained below in FIG. 4). A variety of computer memory types can be used, such as HBM, DRAM, Static Random Access Memory (SRAM), etc. Additionally, the memory 110 can be a single integrated circuit (IC) or multiple ICs operating as a single memory. The memory 110 is coupled to a memory controller 112, which provides input/output interface for the memory 110. In particular, the memory controller 112 can generate read and write commands to the memory 110 in response to requests to access the memory 110. The memory 110 and/or memory controller 112 can include error correction capabilities, such as Error Correction Codes (ECC). For example, each page of the memory can have an associated ECC and the memory controller 112 can generate an ECC based on the contents read from a memory page. When an error is detected, the memory controller 112 transmits error information and associated page information 114 to a cache of counters 120. As described further below, the cache of counters 120 can include a plurality of counters for maintaining a count for each memory page being tracked. However, to save resources, the cache of counters 120 typically has less counters than there are memory pages. For example, the cache of counters can have 64 counters to track errors in up to 64 memory pages. If more than 64 memory pages have errors, then the cache of counters 120 makes decisions about which memory page to evict from the cache of counters and no longer track. As explained further below, such decisions are typically based upon a rate of errors, a number of errors and/or the severity of errors (correctable or uncorrectable errors). For example, if a last error on a memory page happened more than a threshold period of time ago, then it may be decided to no longer track that memory page. Thus, a weighting can be used with input parameters, such as time and count parameters to decide whether to evict a memory page.

When tracking the errors for the memory pages, the cache of counters 120 can determine that one of the counters has exceeded a threshold level. In such a case, the cache of counters 120 can send a page replacement request 130, which includes the page information, to hardware page replacement logic 132. The hardware page replacement logic 132 can include a remapping table 134 that is used to remap addresses of requests for memory pages. For example, application logic 150 can make a request for a memory page having a first address. The hardware page replacement logic 132 can use the remapping table 134 to perform a lookup on the first address and determine that the memory page associated with the first address was replaced due to errors tracked by the cache of counters 120. As a result, the hardware page replacement logic 132 can swap the first address for a second address where the memory page at the first address was moved. Thus, when the page replacement request 130 is received, the hardware page replacement logic 132 cooperates with the memory controller 112 to move the contents of the faulty memory page to a new location in the memory 110. The cache of counters 120, consequently, is used to detect when greater than a threshold number of errors occur on a memory page and to take corrective action by moving the memory page to a different location in the memory 110. In this way, correctable memory errors (which are a precursor to uncorrectable errors) can be detected and corrected before a more catastrophic memory event occurs. One skilled in the art recognizes that the memory controller 112 can be integrated into the memory 110. Additionally, the cache of counters 120 can be integrated into the memory controller 112, memory 110, and/or the hardware page replacement 132. Still further the correctable memory errors can be single error correction, double error detection (SECDED) for single-bit errors or Reed-Soloman for multiple-bit error correction. The uncorrectable errors are simply errors that are not correctable using any existing algorithms (generally some form of multi-bit errors).

Figure 2:
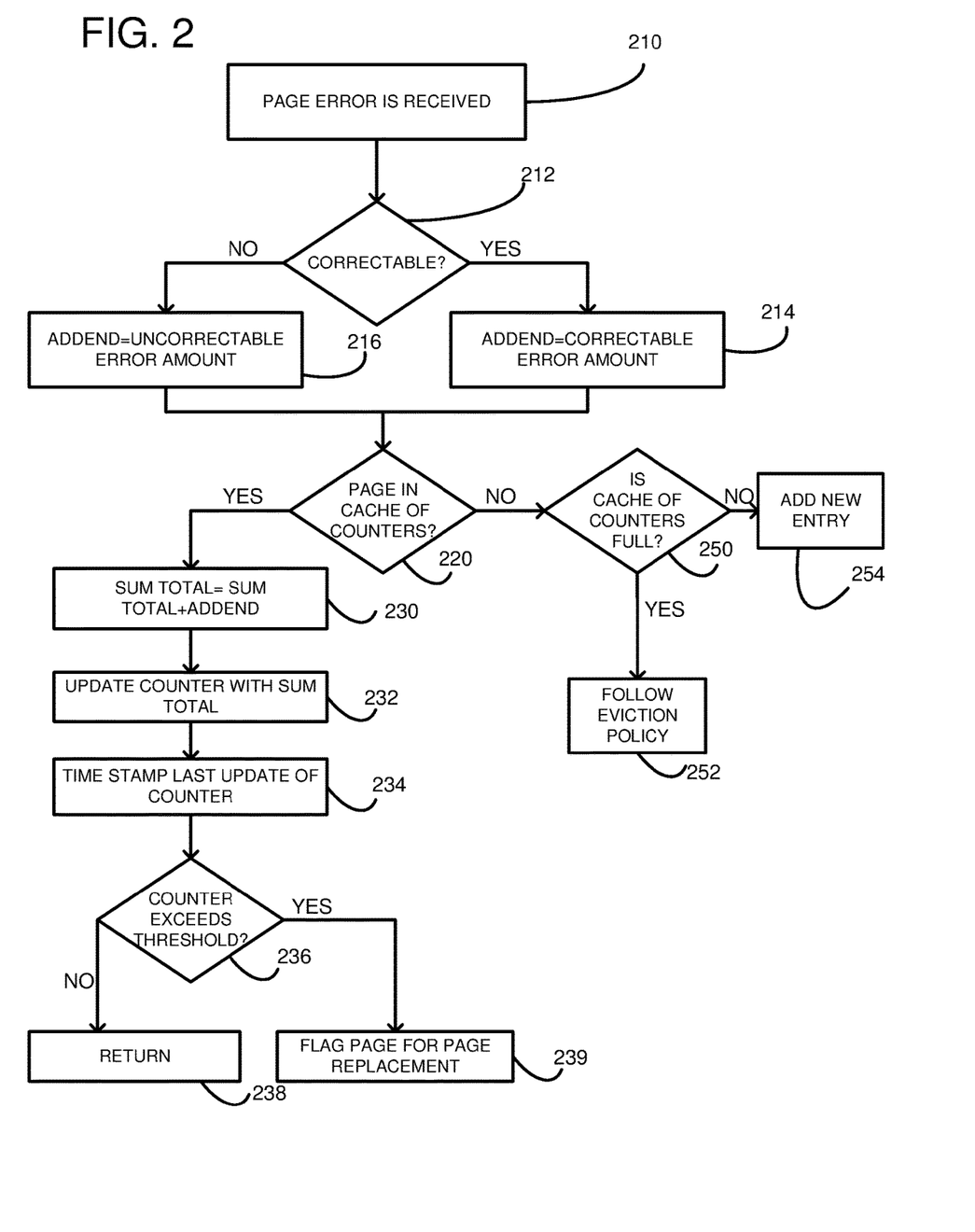
FIG. 2 is a detailed flowchart according to one embodiment for tracking errors in memory pages and for determining which counters are evicted in accordance with an eviction policy.

FIG. 2 is a flowchart according to one embodiment for controlling the system 100 of FIG. 1. In process block 210, a page error is received. For example, the cache of counters 120 (FIG. 1) can receive the error information and associated page information 114. In one example, the error information can be an ECC and the page information can be an address associated with a page of the memory 110. Other types of error information can be used, such as a cyclic redundancy check (CRC), a checksum, etc. In decision block 212, a check is made whether or not the page error is correctable. For example, with ECC, a 1-bit error is correctable while a 2-bit error is not correctable. In either case, a variable called "addend" is assigned a value. In the case where the error is correctable, then in process block 214, addend is assigned a value for correctable errors, such as a 1 (which turns into a simple increment, as described below). In the case where the error is not correctable, then in process block 216, the addend is assigned a value for uncorrectable errors, which is typically a number larger than the correctable error value. By assigning a higher value for uncorrectable errors, a page replacement request occurs more readily.

In decision block 220, a check is made whether the page information is already within the cache of counters. For example, the cache of counters 120 typically tracks up to a predetermined number of pages and the check at decision block 220 is to whether the page associated with the received error is already being tracked. If answered in the affirmative, then at process block 230, the addend is added to the current value of the counter for the memory page to obtain a sum total. In process block 232, the updated value is stored in the counter. At process block 234, a time stamp is stored in association with when the counter value was last changed. The time stamp can be used to determine whether to continue tracking the memory page, as further described below. At decision block 236, a comparison can be made of the current counter value versus a predetermined threshold. The threshold amount can be determined based upon experimental data as to how many correctable errors occur before uncorrectable errors occur. The value can vary based upon the memory type and size of the memory. If decision block 236 is answered in the negative, then at process block 238, the flow simply exits. Otherwise, in decision block 239, a signal is transmitted flagging the page for replacement. For example, in FIG. 1, the signal 130 from the cache of counters can indicate that the hardware page replacement logic 132 should remap the memory page.

If decision block 220 is answered in the negative, then at decision block 250, a check is made whether the cache of counters is full. For example, not all memory pages can be tracked. Instead, for sake of efficiency, only a subset of potential memory pages can be tracked as the number of counters is less than the number of memory pages. If the cache of counters is not full, then there is an available counter and at process block 254, a counter is assigned to the memory page. Additionally, the counter value is made equal to the addend. If decision block 250 is answered in the negative, then at process block 252, a check is made whether a different counter in the cache of counters is to be evicted in favor of tracking the newly received memory page. Such an eviction determination depends upon an eviction policy, which can take into account the time stamp (from 234), a counter value, etc. Additionally, weighting to such input parameters can also be used.

Figure 3:
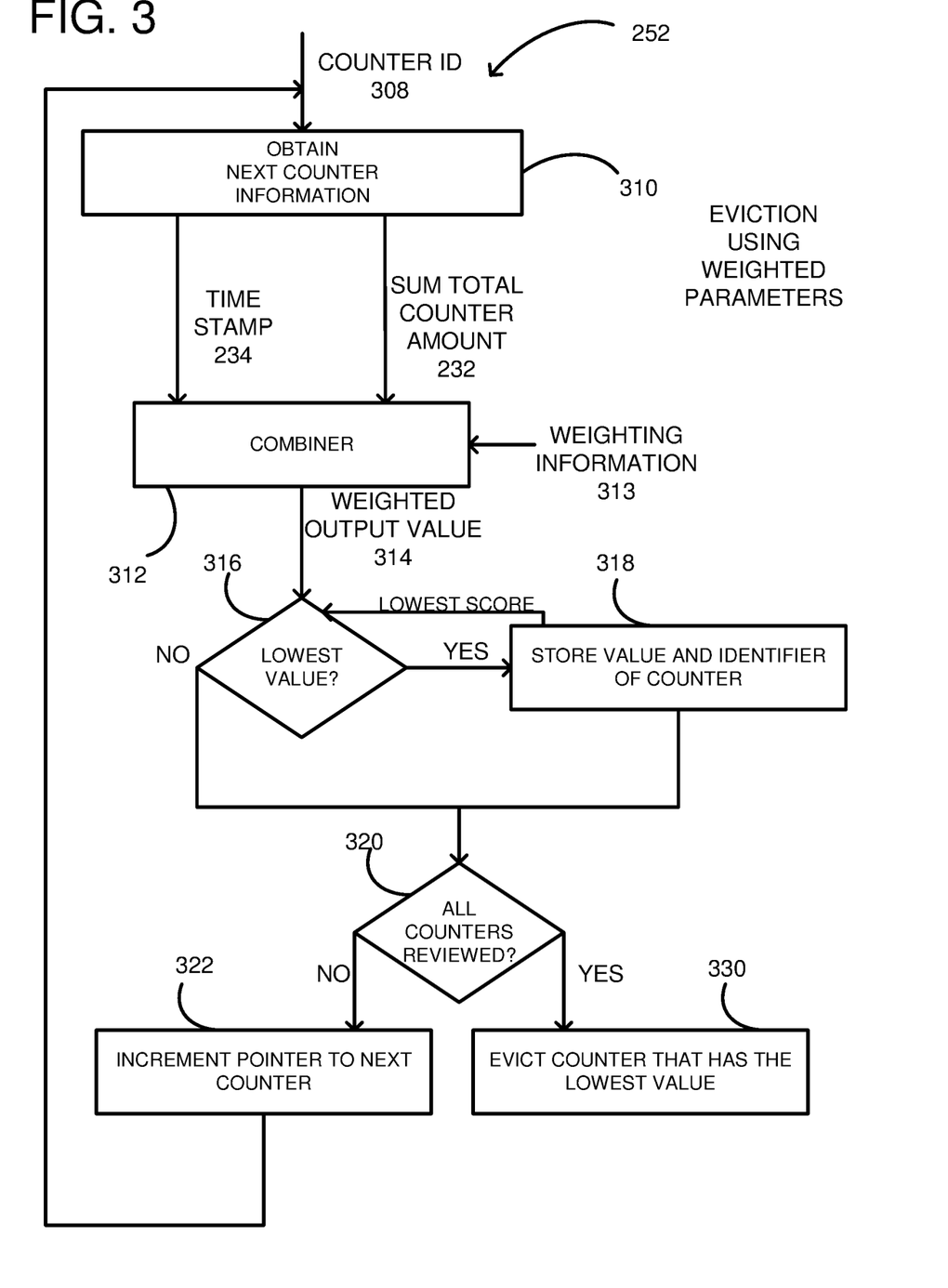
FIG. 3 is flowchart according to one embodiment of the eviction policy of FIG. 2.

FIG. 3 shows further details of the eviction policy from process block 252 (FIG. 2). In short, a weighted score is computed for each counter and the lowest score is evicted. In process block 310, a counter identifier 308 is received and the counter information is obtained, which can include a time stamp 234 (from FIG. 2) and a sum total counter amount 232 (from FIG. 2). The time stamp 234 and sum total 232 are combined in a combiner 312 using weighting information 313. For example, the weighting information 313 can assign different weights to each input. In one example, if a difference between a current time and the time stamp is greater than a threshold period of time, then the weighting can be such as to reduce a weighted output value 314. On the other hand, if the time stamp is recent, then the weighted output value 314 can be increased. In decision block 316, a comparison is made between the weighted output value 314 and the lowest current output value, which is stored at 318. If the weighted output value 314 is lower, it replaces the value at 318 together with an identifier of the counter. Otherwise, if decision 316 is answered in the negative, then a check is made in decision block 320 if all the counters have been reviewed. If not, then at process block 322, a pointer is incremented to point at a next counter and the process begins again at process block 310. Otherwise, at process block 330, the counter having the lowest score stored at 318 is evicted from the cache of counters. Thus, the policy for eviction can be easily changed through changing of the weighting information 313.

Figure 4:
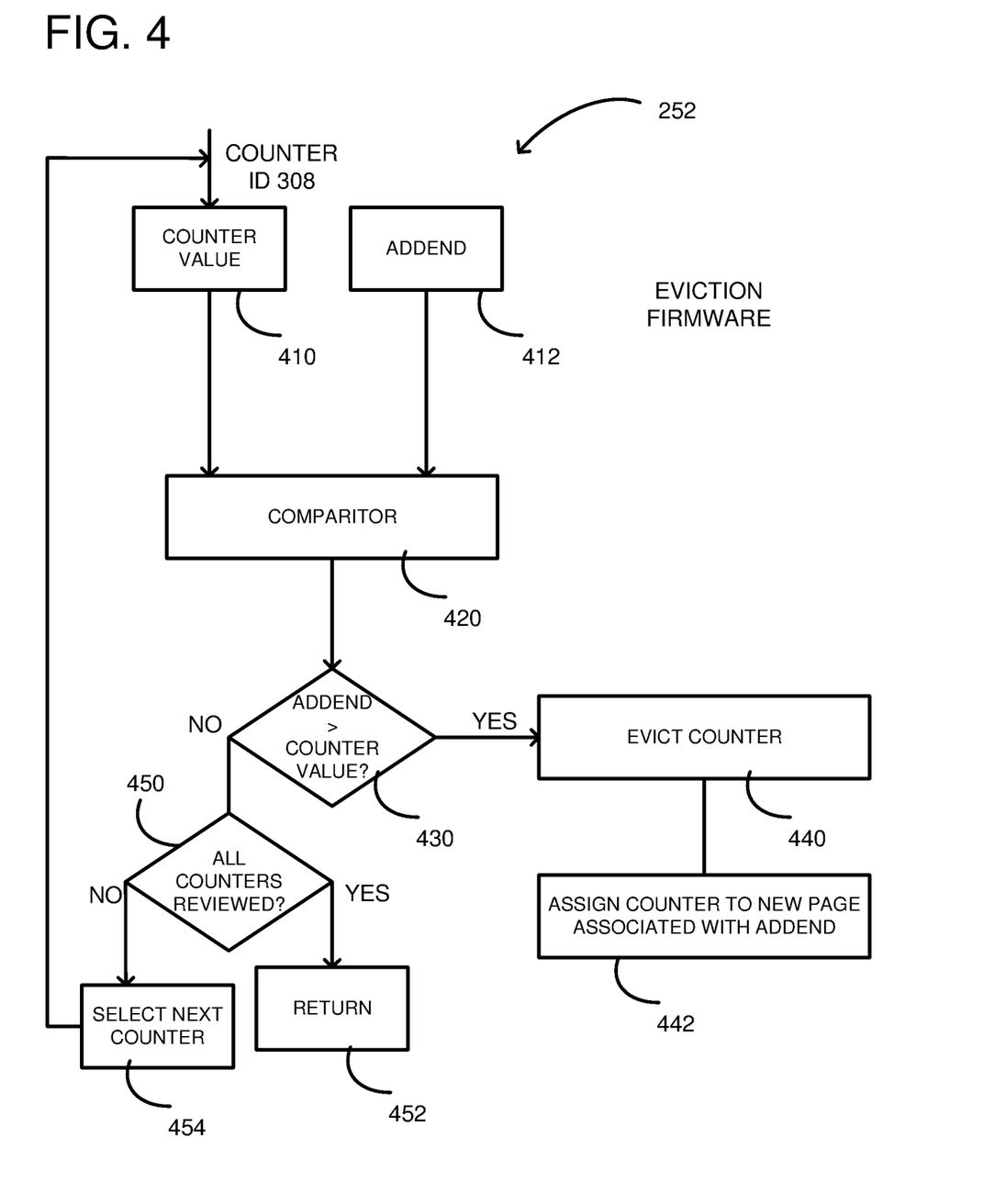
FIG. 4 is a flowchart according to another embodiment of the eviction policy.

FIG. 4 is a flowchart according to an alternative eviction policy. In this alternative eviction policy, only counter values are used without a consideration of a time parameter. Additionally, weighting is not used. A first counter identifier 308 is input to obtain a counter value 410, which is used as a first input parameter. A value of an addend 412 (which can be either 214 or 216 from FIG. 2) is a second input parameter. Both parameters 410, 412 are input into a comparator 420. In decision block 430, a check is made whether the addend 412 is greater than the counter value 410. If so, then the counter is evicted at 440 and the counter is assigned at 442 to the memory page associated with the addend 412. Alternatively, if the addend is less than the counter value, then at decision block 450, a check is made whether all of the counters were analyzed. If yes, then at 452, the routine is complete. Alternatively, a next counter is selected at 454 and the process repeats at 410 with the next counter compared to the addend 412.

Figure 5:
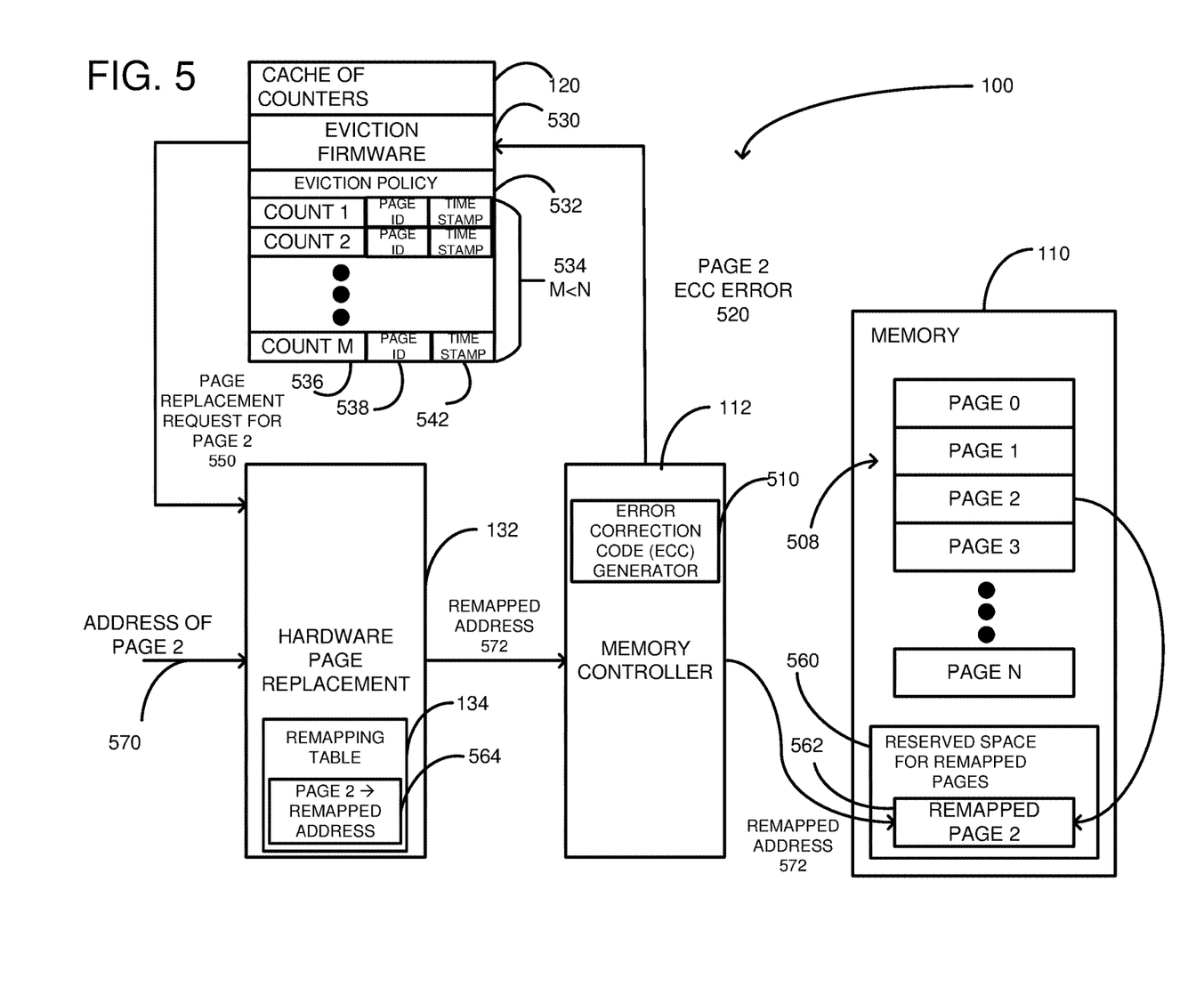
FIG. 5 is a system diagram according to another embodiment where a memory page is remapped in accordance with a page-replacement request from the cache of counters.

FIG. 5 is a detailed embodiment showing the system 100 with a page 2 remapped within the memory 110, which includes N memory pages, shown generally at 508. An ECC generator 510 within the memory controller 112 generates a page 2 ECC error 520, which is transmitted from the memory controller 112 to the cache of counters 120. Particular details of the cache of counters 120 are shown. An eviction firmware 530 within the cache of counters 120 can include hardware and/or software to perform the operations described in FIGS. 2-4 in accordance with an eviction policy 532. A plurality of counters 534 are shown within the cache of counters 120. In particular, M counters 534 are shown, where M is less than the number N of memory pages 508. Although not shown, each counter has a counter ID 308 (see FIGS. 3 and 4) associated therewith. Each counter 534 is shown with 3 parameters including a count parameter 536, a page ID parameter 538 and a time stamp parameter 542.

The count parameter 536 can hold a current count of a number of errors received from the ECC generator 510. For example, each count parameter 536 can store the sum total 230 from FIG. 2. The page ID parameter 538 can store an identifier of the page for which the count relates. The page ID can be an address associated with one of the memory pages 508 in the memory 110. The time stamp parameter 542 can include a time of when the count parameter 536 last changed. For example, the time stamp parameter 542 can store the time stamp 234 from FIG. 2. If the cache of counters logic 120 determines that a page replacement should occur (process block 239 in FIG. 2), then a page replacement request 550 to replace page 2 is made to the hardware page replacement logic 132. The hardware page replacement logic 132 then requests a page address from a reserved space 560 from the memory controller 112. An address of a remapped page 562 can be retrieved by the hardware replacement logic and stored in the remapping table 134 as shown at entry 564. Thus, when an address for page 2 is received, such as at 570, the hardware page replacement logic 132 can search for the address of page 2 in the remapping table 134. When the entry 564 is found, the remapped address 572 is passed through the memory controller 112 to the memory 110 to retrieve the remapped page 2 562.

Figure 6:
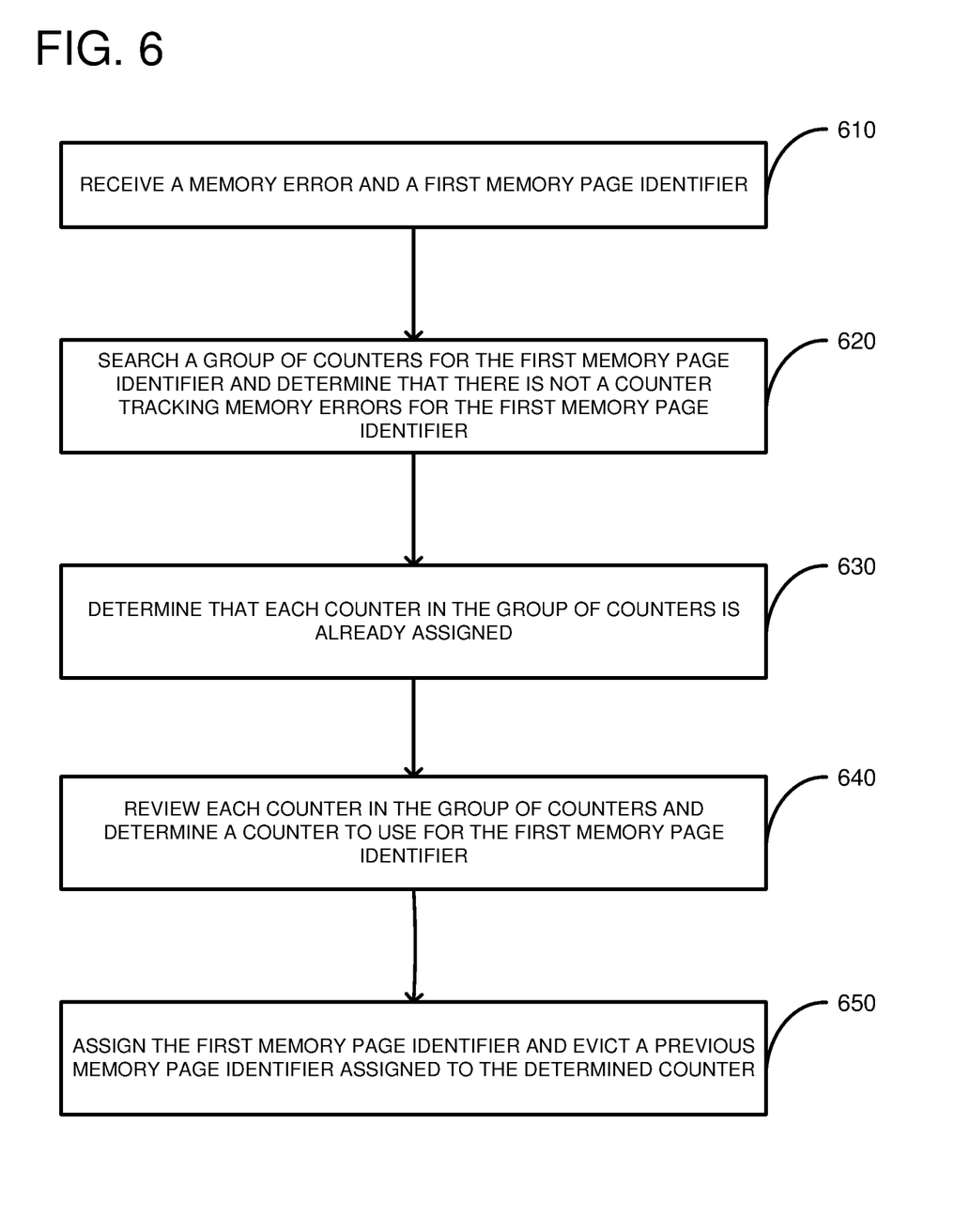
FIG. 6 is a flowchart according to one embodiment for tracking errors in memory pages using counters.

FIG. 6 is a flowchart for tracking memory errors according to one embodiment. In process block 610, a memory error is received together with a first memory page identifier. For example, in FIG. 1, the memory controller 112 can transmit error and page information 114 to the cache of counters 120 that receives such information. The error information can be, for example, ECC information including correctable or uncorrectable ECC information together with the associated page address. At process block 620, a search is performed within a group of counters for the first memory page identifier and a determination is made that there is not a counter for the first memory page identifier. For example, in FIG. 5, when the error information is received at 520 for page 2, page 2 can be searched in the group of counters 534. Additionally, in FIG. 2, it can be determined that the page is not in the cache of counters at 220. At process block 630, a determination is made that each counter in the group of counters is already assigned. For example, it can be determined that the group of counters (e.g., 534 in FIG. 5) are all actively tracking pages so that there is no further room to track another page. As another example, at 250, in FIG. 2, a determination is made that the cache of counters is full. Consequently, the eviction policy 252 is followed. In process block 640, each counter is reviewed in the group of counters to determine which counter to evict. For example, the flowchart of FIG. 3 has a loop where counters are reviewed based upon the weighting information 313 and a determination is made which counter to evict. At process block 650, a counter is selected to be evicted and is consequently replaced by the first memory page identifier. For example, in FIG. 4, when the counter is evicted at 440, that counter is then re-assigned to the new page at process block 440. In this way, the first memory page identifier can be tracked. Such a re-assignment typically occurs when one of the counters becomes less important because its count value is too low and/or it has not registered an error for a long period of time.

Figure 7:
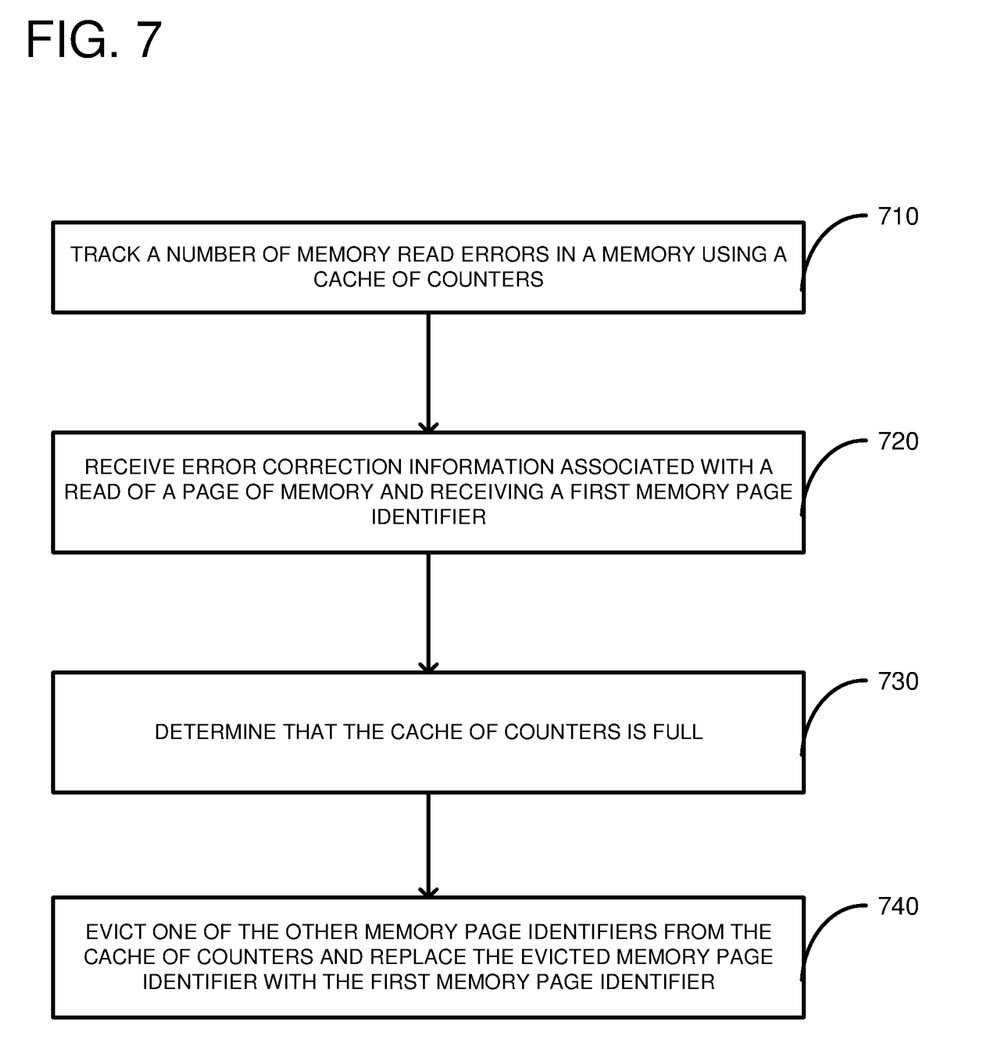
FIG. 7 is a flowchart according to another embodiment for tracking errors in memory pages using a cache of counters.

FIG. 7 is a flowchart according to another embodiment for tracking memory errors. In process block 710, a number of memory read errors is tracked using a cache of counters. For example, in FIG. 1, the cache of counters 120 can be used to track memory errors received from the memory controller 112. In process block 720, error correction information can be received associated with a read of a page of memory. Additionally, a memory page identifier can be received. For example, in FIG. 1, error information and page information 114 can be received by the cache of counters 120. The error information can be an ECC and the page information can be an identifier of the associated memory page, such as a page address. In process block 730, determination is made that the cache of counters is full with other memory page identifiers besides the first memory page identifier. For example, a search is performed for the first memory page identifier in the cache of counters. The eviction firmware 530 can perform the search of the received address in the array of counters 534. In process block 740, one of the memory page identifiers in the cache of counters is evicted and the new memory page identifier is used to replace the evicted memory page identifier. For example, in FIG. 5, if the counters 534 are all full and currently tracking memory pages, then the eviction firmware 530 can evict one of the pages being tracked in favor of tracking the newly received page 520. In this way, the most relevant pages can be tracked.

Figure 8:
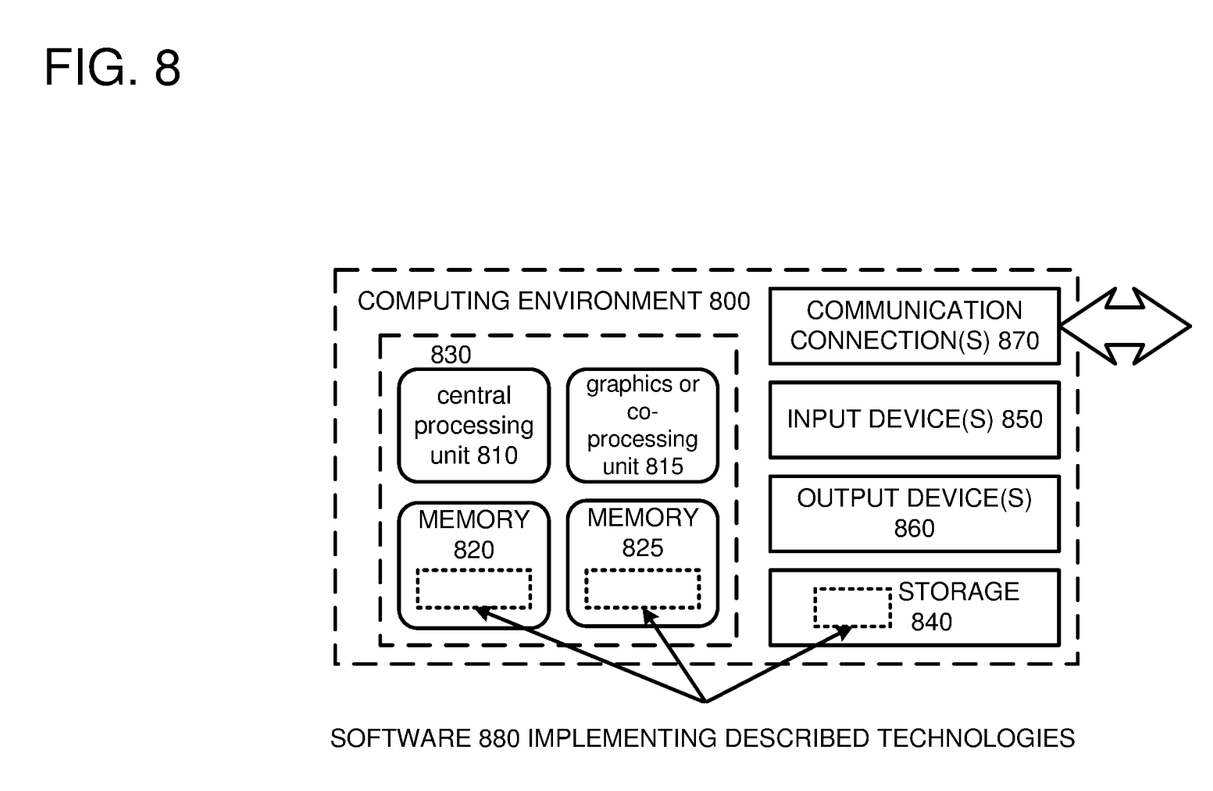
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s). Additionally, one or more components from the computing environment 800 can be used to implement the eviction firmware 530 (FIG. 5).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of error tracking for a memory, the method comprising:
    receiving, in hardware logic associated with a group of counters, an Error Correction Code (ECC) memory error and a first memory page identifier associated with the memory error, wherein each page of the memory has an associated memory page identifier, wherein the group of counters track how many correctable errors occurred;
    using the hardware logic, searching in the group of counters for the first memory page identifier to determine that there is not a counter already tracking memory errors for the first memory page identifier;
    determining that each counter in the group of counters is already assigned to one of the memory page identifiers for the memory;
    reviewing each counter in the group of counters and determining a counter to use for the first memory page identifier based upon, at least in part, a time period since the counter was last updated; and
    evicting a memory page identifier assigned to the determined counter and assigning the first memory page identifier to the determined counter to replace the evicted memory page identifier.

2. The method of claim 1, further including incrementing the determined counter differently depending on whether the ECC memory error is a correctable memory error or an uncorrectable memory error.

3. The method of claim 1, further including storing a time that the counter is incremented for the memory page identifier and wherein the determination of the counter to use for the first memory page identifier depends on a count associated with the memory page identifier associated with the counter and the time that the counter was incremented for the memory page identifier.

4. The method of claim 1, further including comparing the determined counter to a threshold and requesting that a memory page associated with the first memory page identifier be remapped to a replacement memory page when the determined counter reaches the threshold.

5. The method of claim 1, wherein each counter in the group of counters includes a count field and a memory page identifier field.

6. The method of claim 1, wherein a number of counters in the group of counters is less than a number of the pages in the memory.

7. A method, comprising:
using hardware logic in a cache of counters, tracking a number of memory read errors in a memory using the cache of counters, wherein each counter in the cache of counters includes a count parameter for storing a count and an associated memory page identifier parameter for storing a memory page identifier;
counting how many correctable errors occurred associated with each memory page identifier using the cache of counters, wherein the count parameter is set differently based upon whether error correction information is a correctable error or an uncorrectable error;
receiving error correction information associated with a read of a page of memory and receiving a first memory page identifier associated with the page of memory;
using the hardware logic, determining that the cache of counters is full with other memory page identifiers besides the first memory page identifier; and
evicting one of the other memory page identifiers from the cache of counters and replacing the evicted memory page identifier with the first memory page identifier in accordance with an eviction policy.

8. The method of claim 7, wherein the error correction information is an Error Correction Code (ECC) used to correct errors in the page of memory that was read.

9. The method of claim 7, further including tracking when the count parameters are updated and wherein the eviction policy is based upon comparing the count parameters and when the count parameters were updated.

10. The method of claim 7, wherein the cache of counters further includes a time stamp parameter indicating when the count parameter was last updated.

11. The method of claim 7, further including requesting a memory page replacement through address remapping based upon a current count in the count parameter associated with a memory page.

12. The method of claim 7, wherein the eviction policy compares a candidate counter using weighted values associated with an amount of time since the candidate counter was last updated and an amount of the candidate counter to a counter amount associated with the received error correction information.

13. The method of claim 7, wherein the cache of counters includes fewer counters than a number of memory pages in the memory.

14. A system, comprising:
a memory comprising a plurality of memory pages;
a memory controller coupled to the memory;
a cache of counters coupled to the memory controller, wherein the memory controller is configured to transmit an Error Correction Code (ECC) to the cache of counters and the cache of counters is configured to track how many correctable ECC errors occurred associated with memory pages, wherein the cache of counters is configured to increment counters different amounts based on whether the ECC is a correctable ECC or uncorrectable ECC; and
hardware page replacement logic coupled to the cache of counters, wherein the hardware page replacement logic is configured to perform address remapping of an incoming address and deliver a remapped address to the memory controller.

15. The system of claim 14, wherein the cache of counters includes fewer counters than memory pages in the plurality of memory pages.

16. The system of claim 14, wherein each counter in the cache of counters includes a count parameter, a memory page identifier parameter, and a time stamp parameter.

17. The system of claim 14, wherein the cache of counters is configured to evict tracking of a memory page based upon a weighted comparison between different counters in the cache of counters.

18. The system of claim 14, wherein the cache of counters is configured to request the hardware page replacement logic to remap a memory page whose count in the cache of counters has exceeded a threshold.

* * * * *